(12) United States Patent
Murugesan et al.

(10) Patent No.: US 12,486,211 B2
(45) Date of Patent: Dec. 2, 2025

(54) STABILIZING ACROLEIN IN CARBONATE SOLVENTS

(71) Applicant: Baker Hughes Oilfield Operations LLC, Houston, TX (US)

(72) Inventors: Sankaran Murugesan, Katy, TX (US); Zhengwei Liu, Houston, TX (US); Onome Ugono, Rosenberg, TX (US); Jerry J. Weers, Richmond, TX (US); Sanyo Mathew, Missouri City, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 526 days.

(21) Appl. No.: 18/091,350

(22) Filed: Dec. 29, 2022

(65) Prior Publication Data
US 2024/0217909 A1    Jul. 4, 2024

(51) Int. Cl.
C07C 45/86 (2006.01)
C09K 8/532 (2006.01)

(52) U.S. Cl.
CPC .............. *C07C 45/86* (2013.01); *C09K 8/532* (2013.01); *C09K 2208/20* (2013.01)

(58) Field of Classification Search
CPC ...... C07C 45/86; C09K 8/532; C09K 2208/20
See application file for complete search history.

(56) References Cited

U.S. PATENT DOCUMENTS

| | | | |
|---|---|---|---|
| 2,653,172 A * | 9/1953 | Parry | C07C 45/86 568/421 |
| 4,501,668 A | 2/1985 | Merk et al. | |
| 5,352,841 A | 10/1994 | Werle et al. | |
| 8,771,603 B2 | 7/2014 | Harless et al. | |
| 10,633,601 B2 | 4/2020 | Weers | |
| 10,730,818 B2 | 8/2020 | Trahan | |
| 2003/0065110 A1 | 4/2003 | Lepizzera et al. | |

OTHER PUBLICATIONS

Horaska, D. D., et al., "Acrolein Provides Benefits and Solutions to Offshore Oilfield-Production Problems", Oil and Gas Facilities, Aug. 2012, 47-54.
Kissel, Charles L., et al., "Factors Contributing to the Ability of Acrolein to Scavenge Corrosive Hydrogen Sulfide", SPE 11749, Society of Petroleum Engineers, Oct. 1985, 647 and 653.
Shield, Matthew, et al., "Field Experiences Using Acrolein (2-Propenal) for Control of SRB and MIC in an Offshore Production Flowline and Onshore Production Facility In Western Australia", 16th International Oil Field Chemistry Symposium, Geilo, Norway Mar. 13-16, 2005, 1-20.

* cited by examiner

Primary Examiner — Sikarl A Witherspoon
(74) Attorney, Agent, or Firm — Crowe & Dunlevy, P.C.

(57) ABSTRACT

Acrolein is a useful additive for treating hydrocarbon fluids, such as crude oil, for multiple purposes including, but not necessarily limited to, reducing or preventing microbial activity, scavenging hydrogen sulfide (H2S), and/or at least partially dissolving iron sulfide ($Fe_xS_y$). Acrolein can be stabilized against decomposition by mixing or combining it with at least one alkyl carbonate, which can also raise the flash point of the stabilized acrolein composition.

18 Claims, 11 Drawing Sheets

STABILIZING ACROLEIN IN CARBONATE SOLVENTS

TECHNICAL FIELD

The present invention relates to methods for treating hydrocarbon fluids with acrolein for purposes including, but not necessarily limited to, scavenging sulfur compounds such as hydrogen sulfide ($H_2S$), reducing or preventing microbiological activity, and dissolving iron sulfide from the fluids, and more particularly relates to methods for treating hydrocarbon fluids with acrolein where the acrolein is stabilized against decomposition by mixing or blending it with a solvent.

BACKGROUND

It is well known that acrolein ($CH_2$=CHCHO) has been used extensively as an additive in methods for treating hydrocarbon fluids, such as crude oil or mixed production, for purposes including, but not necessarily limited to, scavenging sulfur compounds such as hydrogen sulfide ($H_2S$), reducing or preventing microbiological activity, and dissolving iron sulfide from the fluids. Iron sulfides in their various forms and formulae will be denoted herein as $Fe_xS_y$, generally. Mixed production is defined herein as crude oil in some kind of mixture with water, which can be fresh water or brine.

Although it has beneficial uses, acrolein is viewed as a dangerous chemical due to its health, safety, and environmental (HSE) issues. In order to mitigate the risk, only trained certified professionals are allowed to use this chemical.

Acrolein is generally blended with a methanol ($CH_3OH$) based solvent for oilfield applications. However, since methanol is a solvent with a low flash point (about 12° C.), there is a need for a better solvent system compatible with acrolein. Additionally, it would be helpful if the solvent could help stabilize the acrolein, which can decompose over time. Acrolein stability is very dependent on pH.

It would be desirable if a new solvent could be found for acrolein that would be useful in oilfield applications.

SUMMARY

There is provided, in one form, a method for stabilizing acrolein from decomposition, where the method includes mixing acrolein with an amount of at least one alkyl carbonate solvent effective to stabilize the acrolein from decomposing to form a stabilized acrolein composition.

There is additionally provided in a different non-limiting embodiment a stabilized acrolein composition that includes acrolein and an amount of at least one alkyl carbonate solvent effective to stabilize the acrolein from decomposing.

Further there is provided a method for treating a hydrocarbon fluid where the method includes introducing an amount of a stabilized acrolein composition into the hydrocarbon fluid in an amount effective to treat it, where the treating can include reducing or preventing microbial activity in the hydrocarbon fluid, at least partially scavenging hydrogen sulfide from the hydrocarbon fluid, and/or at least partially dissolving iron sulfide in the hydrocarbon fluid. The stabilized acrolein composition includes acrolein and an amount of at least one alkyl carbonate solvent effective to stabilize the acrolein from decomposing.

DETAILED DESCRIPTION

Figure 1:
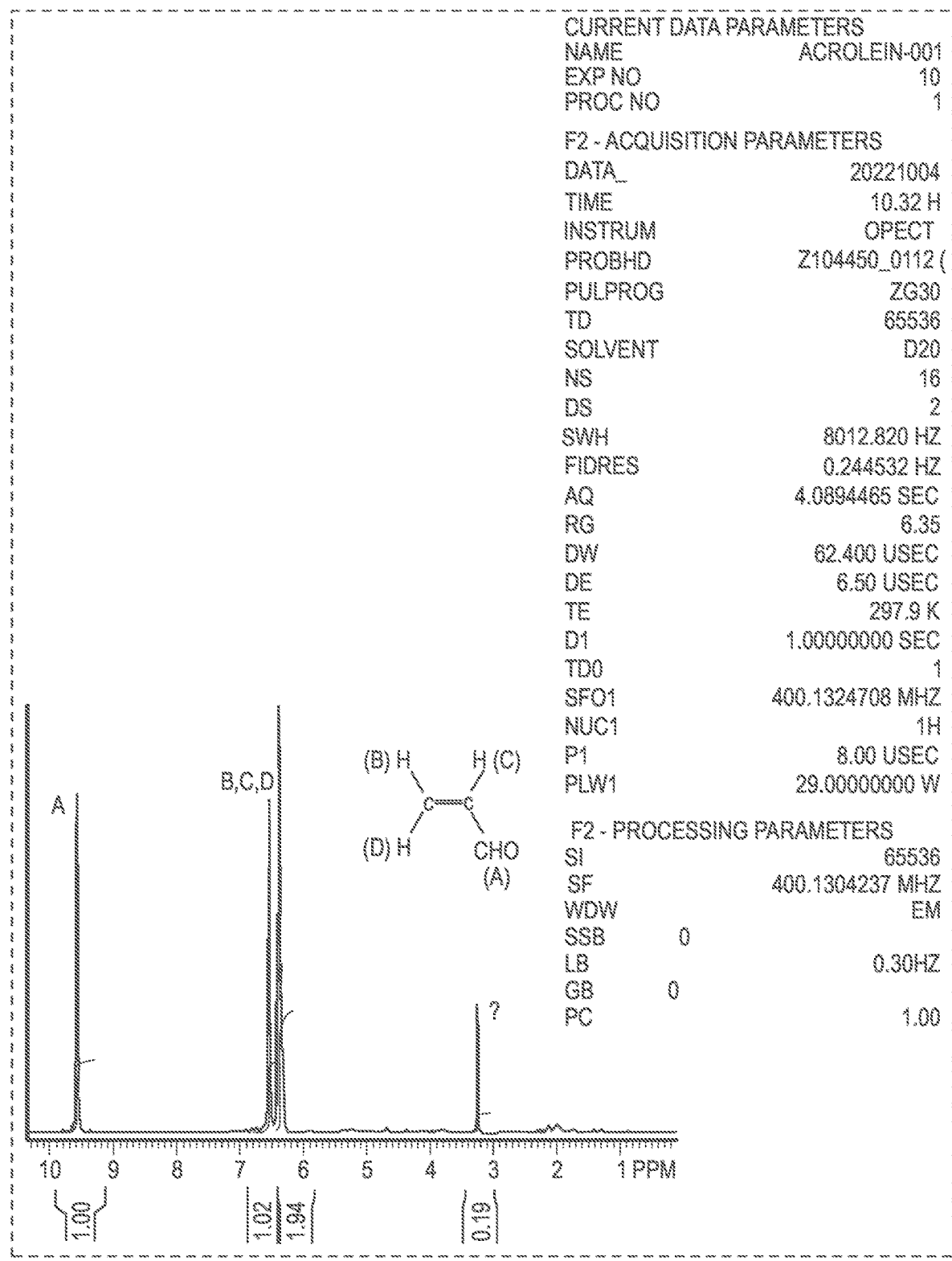
FIG. 1 is a NMR analysis of acrolein.

It has been discovered that alkyl carbonate solvents are useful to stabilize acrolein and do not interfere with the ability of acrolein to be a hydrogen sulfide scavenger, to serve as a microbicide, and/or to dissolve iron sulfide. That is, there is no negative effect of the alkyl carbonate solvent on acrolein performance.

The alkyl carbonate solvents used in the stabilized acrolein compositions described herein have higher flash points than methanol (about 12° C.); for instance, propylene carbonate has a flash point of about 132° C. and a boiling temperature of about 242° C. Combinations of alkyl carbonates can be used together, for instance, a mixture of ethylene carbonate and propylene carbonate to give a better solvent blend.

In one non-limiting embodiment, suitable organic alkyl carbonate solvents have the formula ROC(=O)OR', where R and R' are independently C1-C18 alkyl, alkaryl, hydroxyalkyl or aryl, or where R and R' are joined to form a cyclic alkyl carbonate optionally having one or more substituents selected from the group consisting of one or more aryl groups, one or more hydroxy groups, and/or one or more branched alkyl groups. In one non-limiting embodiment, the alkyl carbonate solvent is a dialkyl carbonate and/or a cyclic carbonate. In another non-restrictive version, the alkyl carbonates are the relatively low molecular weight solvents of ethylene carbonate (EC) and/or propylene carbonate (PC).

The stabilized acrolein composition has a number of modified characteristics from acrolein per se, such as changes in the solubility profile, changes in viscosity, and changes in reactivity. Changes in reactivity may play a role in the reaction of acrolein with $H_2S$. Furthermore, alkyl carbonates are known to be $H_2S$ scavengers themselves as disclosed in U.S. Pat. No. 10,633,601 (Baker Hughes). Thus, both the alkyl carbonate and the acrolein in the stabilized acrolein composition can have the ability to scavenge $H_2S$; however, it was not known from this patent that alkyl carbonates were compatible with acrolein, or that alkyl carbonates did not have an adverse impact on acrolein performance.

In the stabilized acrolein composition, in one non-limiting embodiment, the proportion of alkyl carbonate may range from about 10 wt % independently to about 90 wt %; alternatively, from about 20 independently to about 80 wt %. The proportion range for acrolein in the stabilized acrolein composition may range from about 0.1 wt % independently to about 99 wt %; alternatively, from about 10 wt % independently to about 80 wt %. The term "independently" when used herein with respect to a range is defined to mean that any threshold may be used together with any other threshold for that range to give a suitable alternative range. In a non-limiting example, a suitable acrolein range may be from about 0.1 wt % to about 10 wt %.

In the practice of introducing the stabilized acrolein composition to a hydrocarbon fluid such as mixed production in one non-limiting embodiment, the additive blend may range from 1 ppm independently to about 10 wt %; alternatively from about 1 ppm to about 10,000 ppm.

The method and compositions described herein will now be discussed with reference to certain specific Examples which are intended to further illustrate, but not necessarily limit the method and the compositions.

Examples 1-11

Presented in Tables I and II are the results of $H_2S$ for acrolein using test method ASTM D5705 using the following parameters. As noted for the blank Examples 1 and 6, different initial concentrations of $H_2S$ were used. Composition percentages are weight percentages unless otherwise noted.

Charge bottle individually with brine and then add sour ISOPAR M™ solvent to simulate the hydrocarbon.
Test Duration: 120 minutes
Test Medium: Oil/Water Ratio: 70% ISOPAR M/30% Brine
Test Temp.: 49° C.
Test Agitation Orbital @ 50 rpm
Test Volume: 250 ml total (75 ml brine/175 ml $H_2S$ sparged ISOPAR M)

TABLE I $H_2S$ Scavenging Test Results for Acrolein

| Ex. | $H_2S$ Scavenger/Additive | Dosage, ppm | Dosage, µl | ppm $H_2S$ | % scavenged |
|---|---|---|---|---|---|
| 1 | Untreated | — | — | 2500 | — |
| 2 | Acrolein | 200 | 50 | >2000 | <20 |
| 3 | Acrolein | 300 | 75 | >2000 | <20 |
| 4 | Acrolein | 500 | 125 | >2000 | <20 |
| 5 | Acrolein | 700 | 175 | 1700 | 32 |

TABLE II $H_2S$ Scavenging Test Results for Acrolein

| Ex. | $H_2S$ Scavenger/Additive | Dosage, ppm | Dosage, µl | ppm $H_2S$ | % scavenged |
|---|---|---|---|---|---|
| 6 | Untreated | — | — | 4500 | — |
| 7 | Acrolein | 100 | 25 | 3000 | 33 |
| 8 | Acrolein | 700 | 175 | 2500 | 44 |
| 9 | Acrolein | 1000 | 250 | 2000 | 56 |
| 10 | Blend 50% (50% EC + 50% PC)/50% Acrolein | 600 (300 ppm acrolein) | 150 | 2500 | 44 |
| 11 | Blend 25% (50% EC + 75% PC)/50% Acrolein | 600 (300 ppm acrolein) | 150 | 2500 | 44 |

Examples 12-16

Acrolein Stability Testing

Testing was conducted to determine acrolein stability in alkyl carbonate solvents as a possible mode for storage of the acrolein, as well as toward addressing HSE concerns. Experiments were conducted to show the presence, and consequently stability, of acrolein in various solvent blends compared to methanol and isopropyl alcohol, which are currently used as carrier solvents in the oil field and for transporting acrolein. Generally, in the presence of water or methanol, acrolein decomposes over time, whereas in the presence of the organic alkyl carbonates, it is stable over time.

Figure 2:
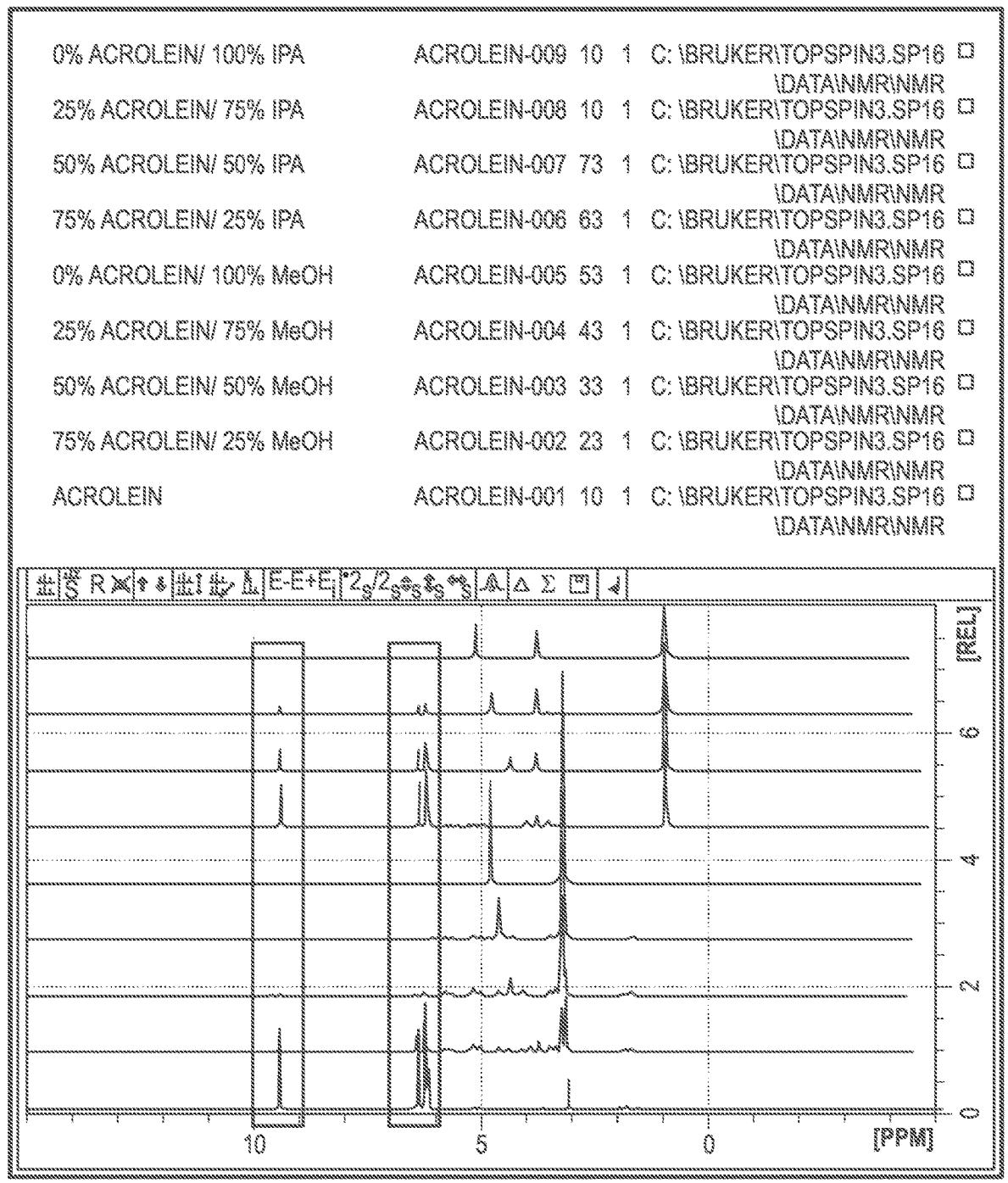
FIG. 2 are NMR analyses of isopropyl alcohol (IPA) alone and in various mixtures with acrolein (top four curves), and methanol (MeOH) alone, in various mixtures with acrolein, and acrolein alone (bottom five curves)

FIG. 1 is a NMR analysis of acrolein alone. FIG. 2 are NMR analyses of isopropyl alcohol (IPA) alone and in various mixtures with acrolein (top four curves), and methanol (MeOH) alone, in various mixtures with acrolein, and acrolein alone (bottom five curves). It can be seen that acrolein decomposes over time in all mixtures with methanol.

Table III provides the solvent mixture details for Examples 12-16.

TABLE III

Alkyl Carbonate Solvents for Acrolein

| Example | Solvent ID | Details |
|---|---|---|
| 12 | Solvent 1 | 75% EC + 25% PC |
| 13 | Solvent 2 | 50% EC + 50% PC |
| 14 | Solvent 3 | 25% EC + 50% PC |
| 15 | Solvent 4 | 35.6% EC in $H_2O$ |
| 16 | Solvent 5 | 50.5% EC in $H_2O$ |

Figure 3:
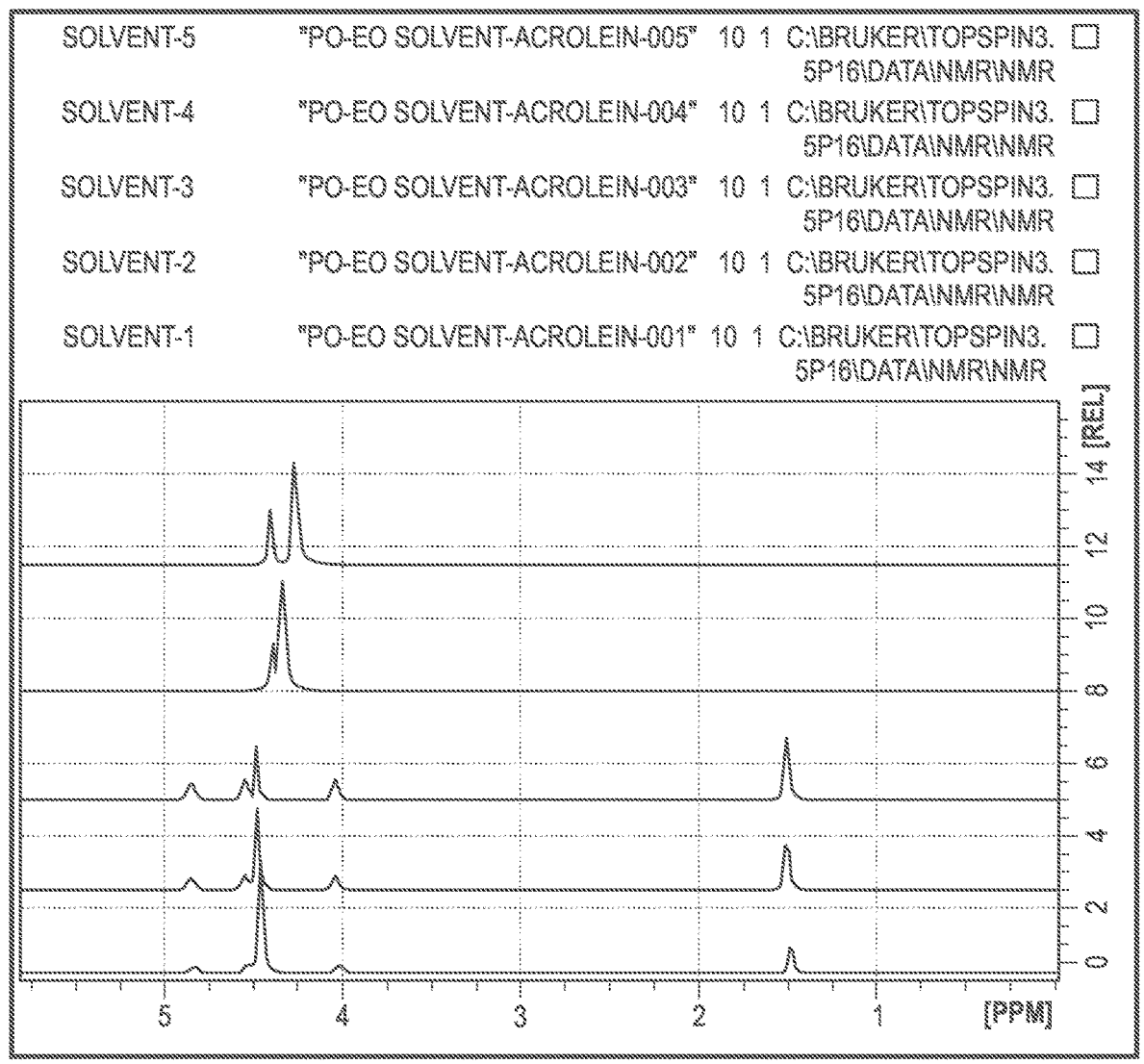
FIG. 3 are initial NMR analyses of various solvents.

FIG. 3 presents the initial NMR analyses of the various Solvents 1-5.

From the mole % calculation by NMR the amount of acrolein is about 35% of acrolein presence in each solvent.

Figure 4:
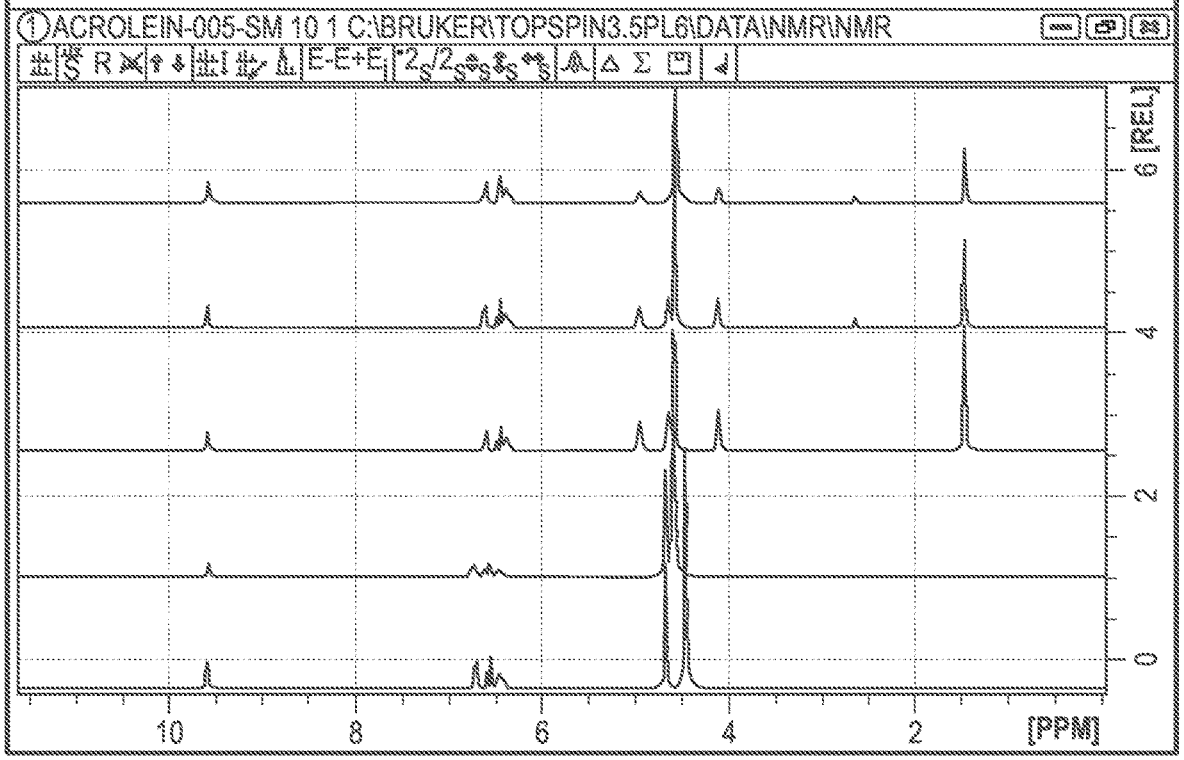
FIG. 4 are NMR analyses of acrolein in mixtures with the various solvents after one day.
Figure 5:
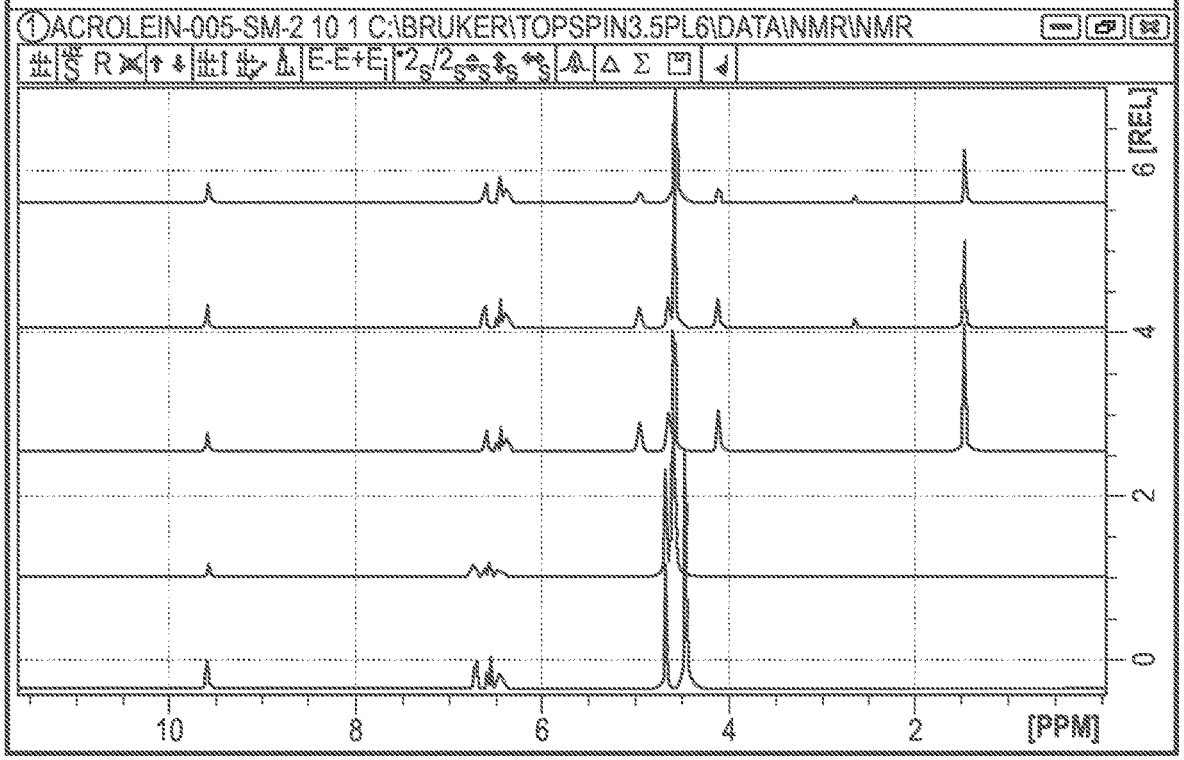
FIG. 5 are NMR analyses of acrolein in mixtures with the various solvents of FIG. 4 after six days.

FIG. 4 presents the NMR analyses of acrolein in mixtures with the various Solvents 1-5 after one day. FIG. 5 presents the NMR analyses of acrolein in mixtures with the various Solvents 1-5 after six days.

Figure 6:
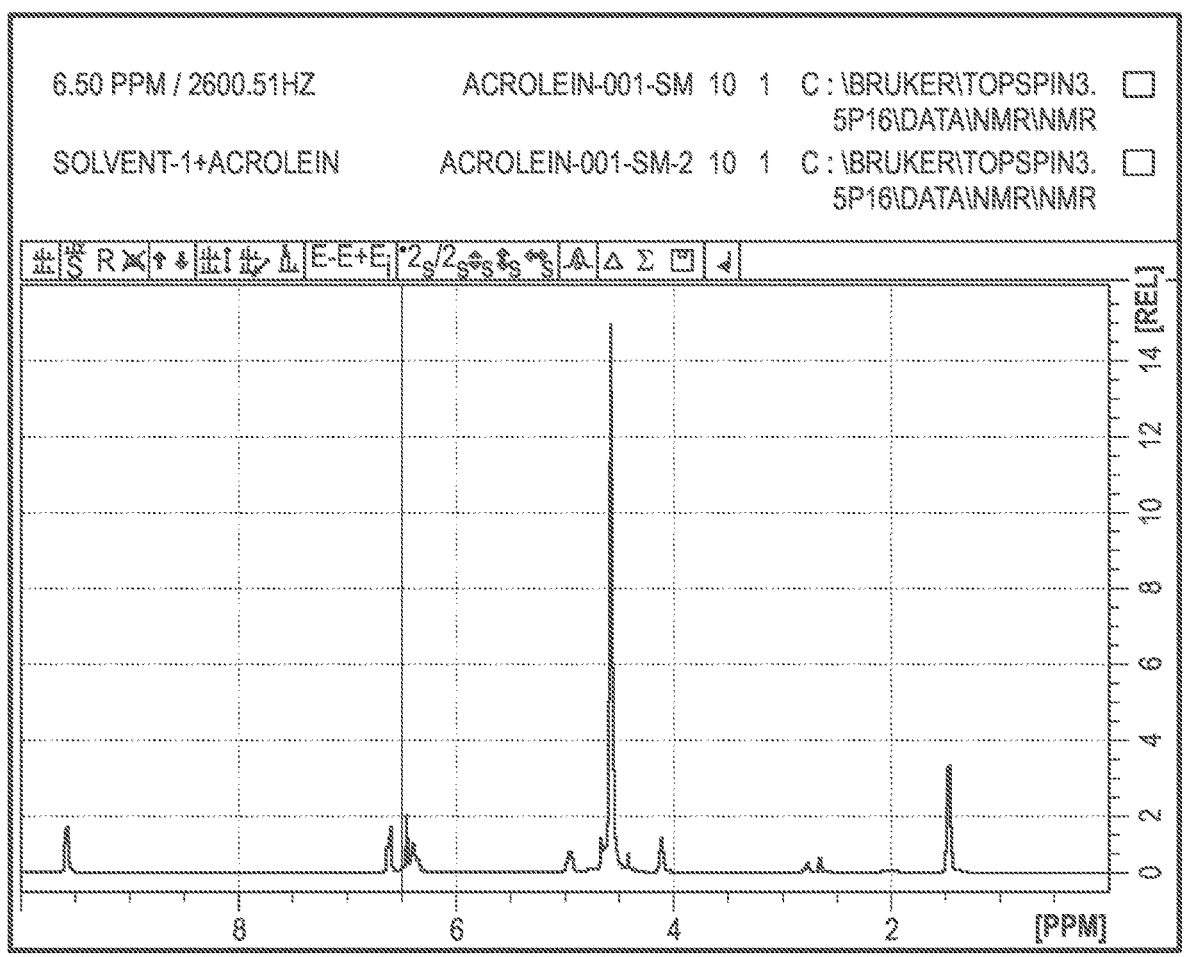
FIG. 6 is a focused comparison of the NMR analyses of day 1 with day 6 for the mixture of acrolein with Solvent 1.
Figure 7:
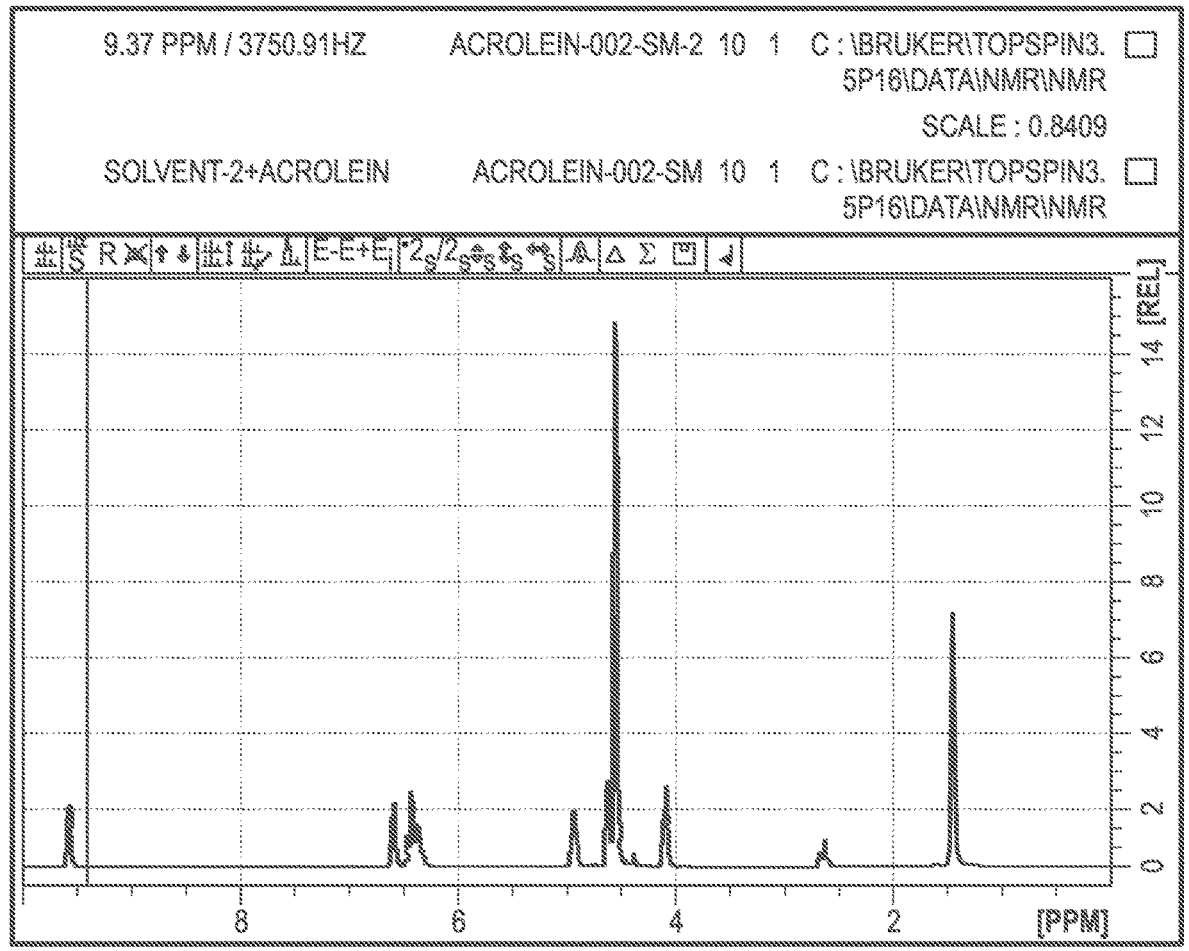
FIG. 7 is a focused comparison of the NMR analyses of day 1 with day 6 for the mixture of acrolein with Solvent 2.
Figure 8:
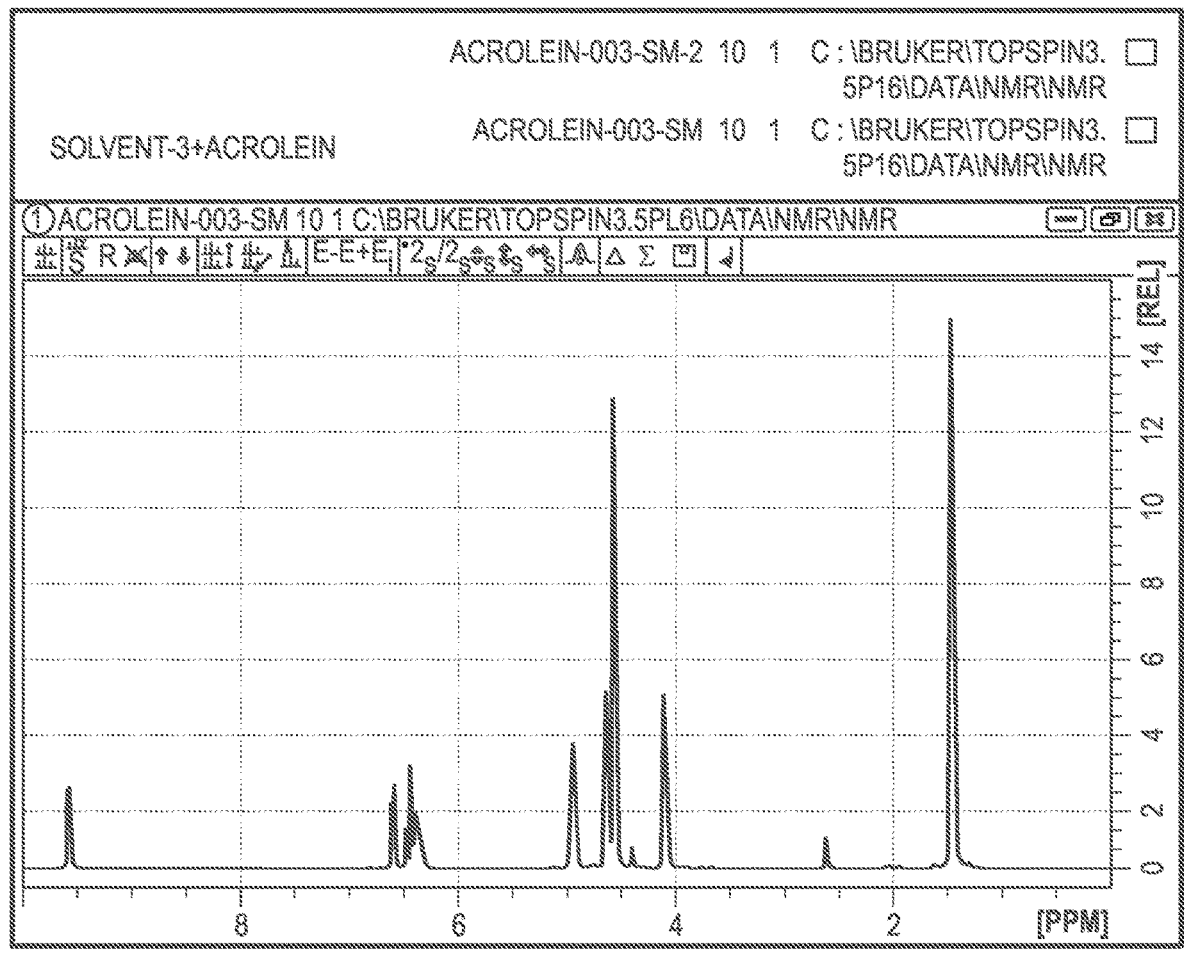
FIG. 8 is a focused comparison of the NMR analyses of day 1 with day 6 for the mixture of acrolein with Solvent 3.
Figure 9:
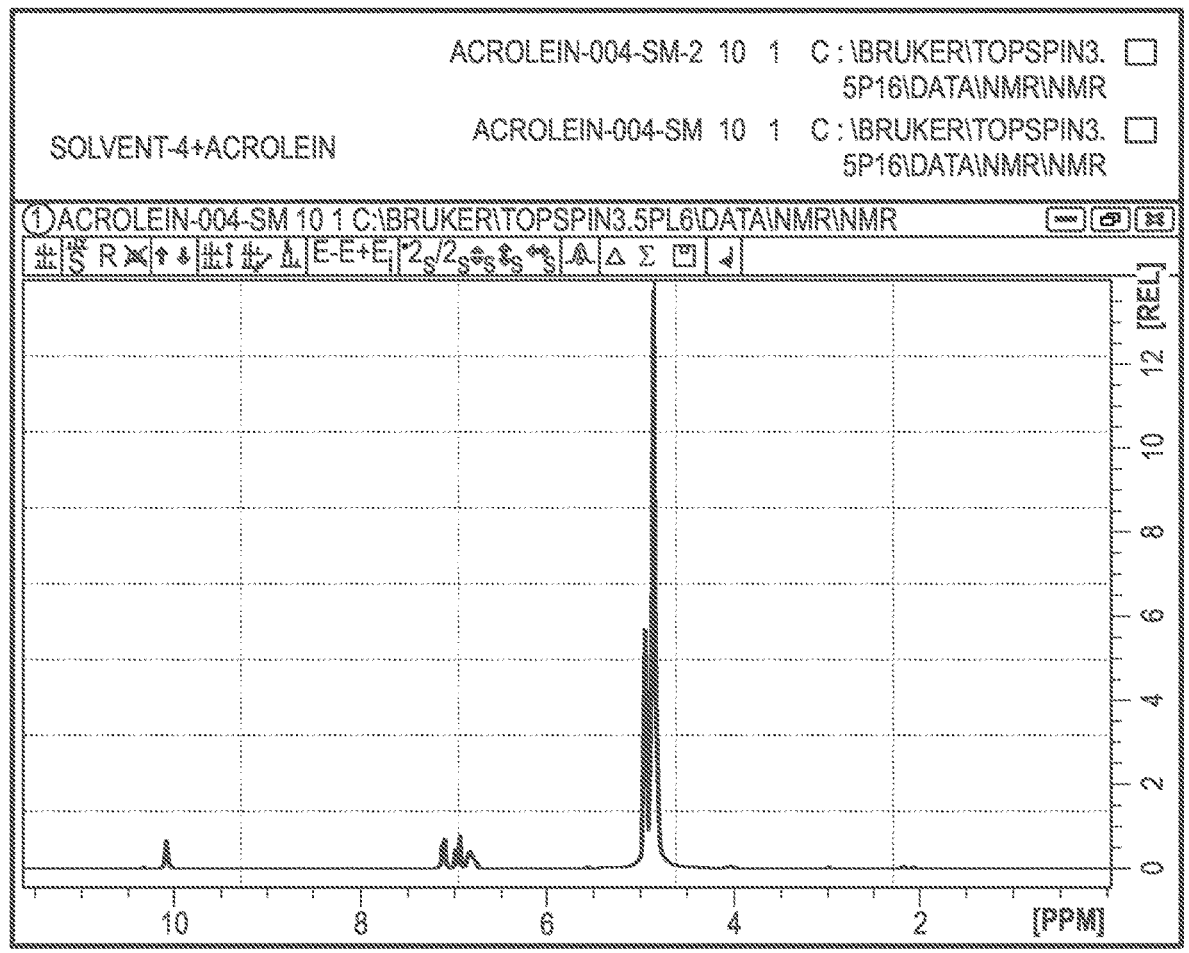
FIG. 9 is a focused comparison of the NMR analyses of day 1 with day 6 for the mixture of acrolein with Solvent 4.
Figure 10:
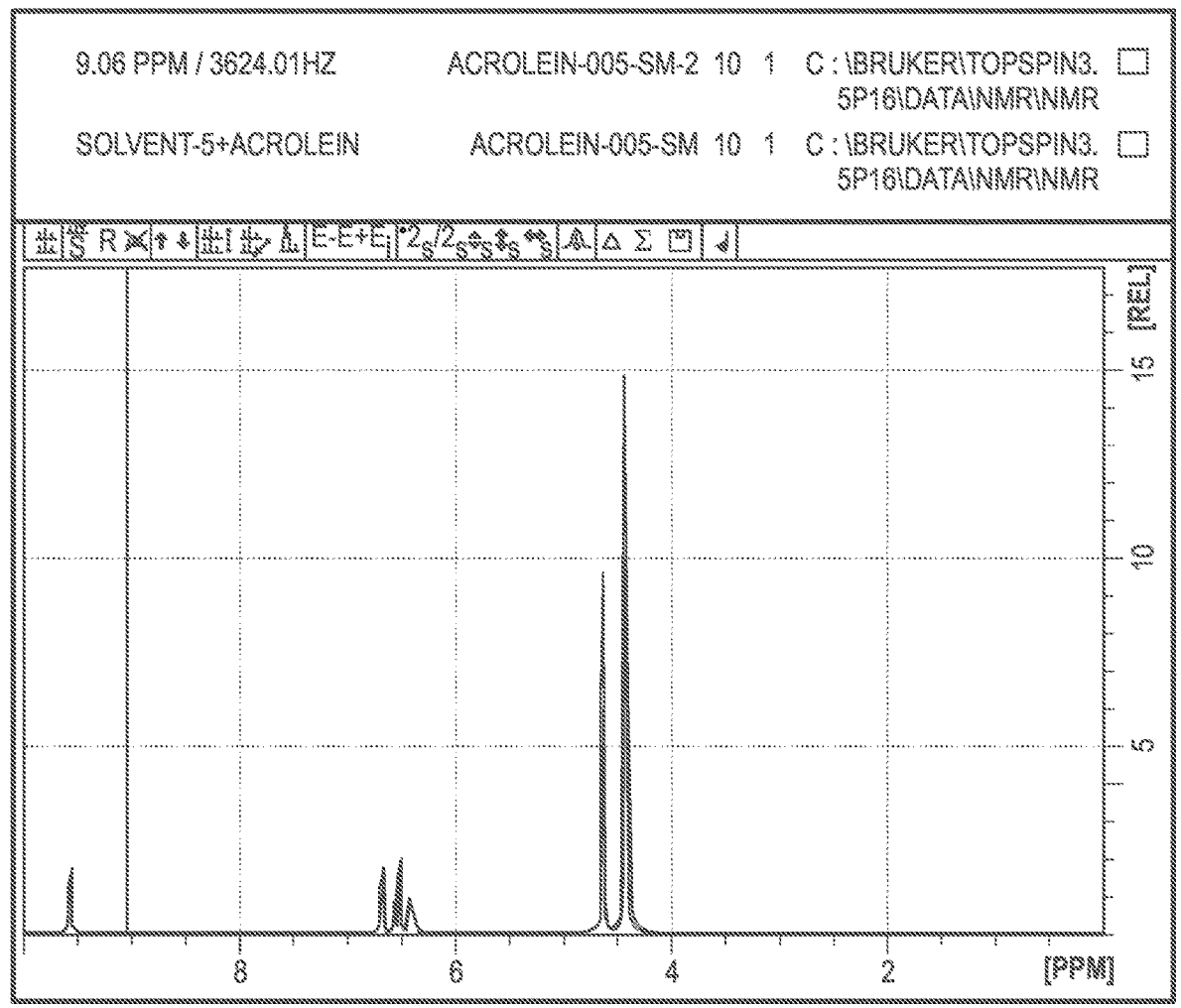
FIG. 10 is a focused comparison of the NMR analyses of day 1 with day 6 for the mixture of acrolein with Solvent 5.

FIG. 6 is a focused comparison of the NMR analyses of day 1 with day 6 for the mixture of acrolein with Solvent 1; FIG. 7 is a focused comparison of the NMR analyses of day 1 with day 6 for the mixture of acrolein with Solvent 2; FIG. 8 is a focused comparison of the NMR analyses of day 1 with day 6 for the mixture of acrolein with Solvent 3; FIG. 9 is a focused comparison of the NMR analyses of day 1 with day 6 for the mixture of acrolein with Solvent 4; and FIG. 10 is a comparison of the NMR analyses of day 1 with day 6 for the mixture of acrolein with Solvent 5. Temperature and long term storage stability study shows that there is no reaction happening over longer periods of time, 15 days and 32 days, and also even at higher temperature (40° C.) there is no separation of acrolein from the solvent mixture.

There is no formation of new peaks in NMR, which indicates that the alkyl carbonate solvent is able to stabilize acrolein.

Figure 11:
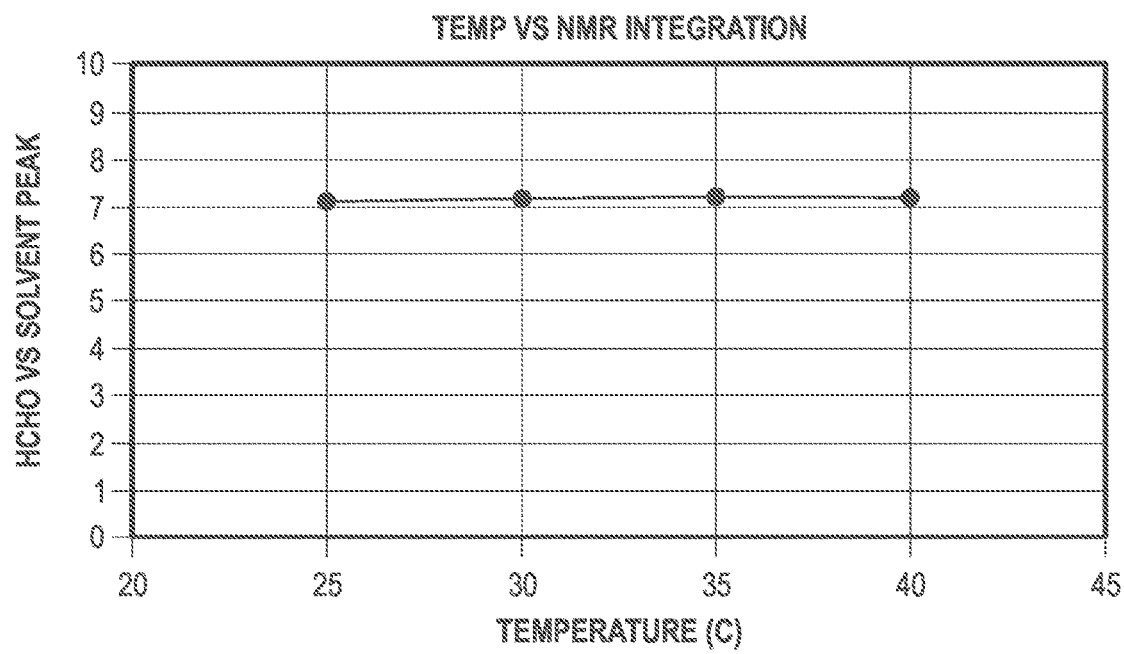
FIG. 11 is a stability plot for solvent 3 of temperature vs. NMR integration for acrolein vs. solvent peaks for 25° C., 30° C., 35° C., and 40° C.

FIG. 11 is a stability plot for solvent 3 of temperature vs. NMR integration for acrolein vs. solvent peaks for 25° C., 30° C., 35° C., and 40° C. It can be seen that the plot is remarkably flat, indicating the acrolein was stabilized over this temperature range.

Table IV is a table of normalized NMR integration over the integrated days vs. change in integration (HCHO vs. solvent peaks) also reflecting acrolein stability.

TABLE IV

Normalized NMR Integration Days vs. Change in Integration (HCHO vs. Solvent Peak)

| Ex. | Days | Solvent 1 | Solvent 2 | Solvent 3 | Solvent 4 | Solvent 5 |
|---|---|---|---|---|---|---|
| 16 | 0 | 0 | 0 | 0 | 0 | 0 |
| 17 | 6 | 0.039 | 0.087 | 0 | 0.068 | 0.075 |
| 18 | 15 | 0.114 | 0.114 | 0.005 | 0.195 | 0.162 |
| 19 | 32 | 0.237 | 0.263 | 0.72 | 0.486 | 0.382 |

Figure 12:
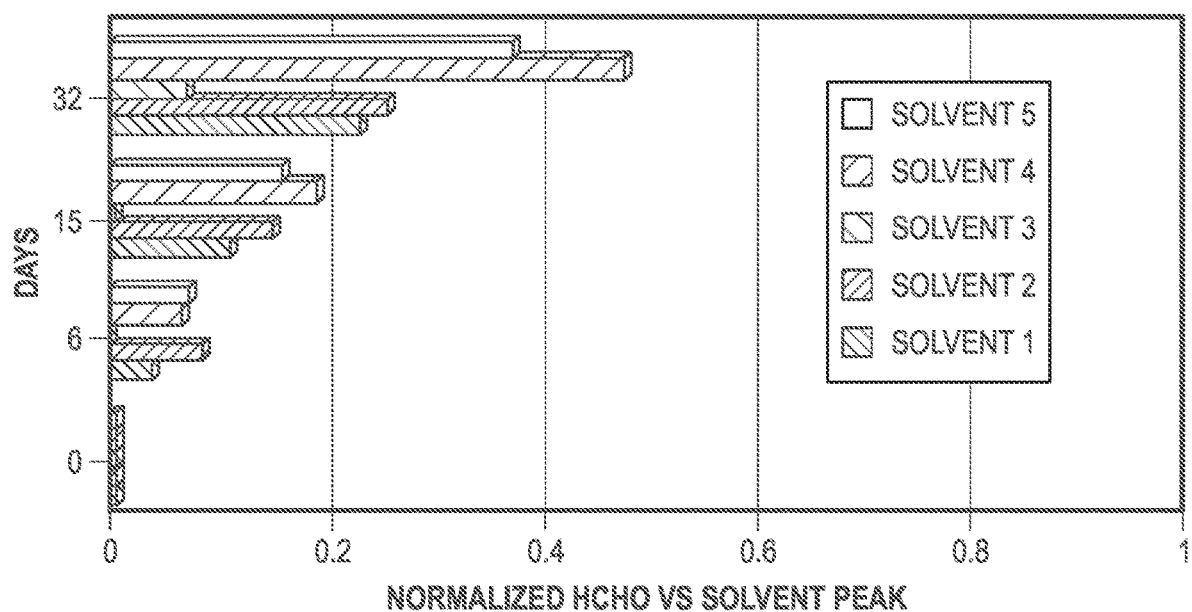
FIG. 12 presents normalized acrolein vs. solvent peaks illustrating that there is no decomposition of acrolein happening in the alkyl carbonate-based solvents.

Finally, FIG. 12 presents normalized HCHO vs. solvent peaks illustrating that there is no decomposition of acrolein happening in the alkyl carbonate-based solvents.

In the foregoing specification, the method has been described with reference to specific embodiments thereof and has been shown as effective in stabilizing acrolein.

It will be evident that various modifications and changes can be made to the methods and compositions described herein without departing from the broader scope of the invention as set forth in the appended claims. Accordingly, the specification is to be regarded in an illustrative rather than a restrictive sense. For example, specific organic alkyl carbonates, fluids, solvents, hydrocarbons, water, ratios, dosages, orders of addition, proportions, and time periods thereof falling within the claimed parameters, but not specifically identified or tried in a particular method or composition to stabilize acrolein, are expected to be within the scope of this application.

The present application may suitably comprise, consist, or consist essentially of the elements disclosed and may be practiced in the absence of an element not disclosed. For instance, there may be provided a method for stabilizing acrolein from decomposition, the method comprising, consisting essentially of, or consisting of, mixing acrolein and an amount of at least one alkyl carbonate solvent effective to stabilize the acrolein from decomposing to form a stabilized acrolein composition Further there may be provided a stabilized acrolein composition that comprises, consists essentially of, or consists of, acrolein and an amount of at least one alkyl carbonate solvent effective to stabilize the acrolein from decomposing.

Additionally, there may be provided a method for treating a hydrocarbon fluid, the method comprising, consisting essentially of, or consisting of, introducing an amount of a stabilized acrolein composition into the hydrocarbon fluid in an amount effective to treat it, where the treating is selected from the group consisting of reducing or preventing microbial activity in the hydrocarbon fluid, at least partially scavenging hydrogen sulfide from the hydrocarbon fluid, and/or at least partially dissolving iron sulfide in the hydrocarbon fluid, where the stabilized acrolein composition comprises, consists essentially of, or consists of acrolein and an amount of at least one alkyl carbonate solvent effective to stabilize the acrolein from decomposing within the stabilized acrolein composition.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature, or method act indicates that such is contemplated for use in implementation of an embodiment of the disclosure and such term is used in preference to the more restrictive term "is" so as to avoid any implication that other, compatible materials, structures, features, and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method for stabilizing acrolein from decomposition, the method comprising mixing:

acrolein; and an amount of at least one alkyl carbonate solvent effective to stabilize the acrolein from decomposing;

to form a stabilized acrolein composition.

2. The method of claim 1 where the at least one alkyl carbonate solvent is selected from the group of alkyl carbonates consisting of the formula ROC(=O)OR', where R and R' are independently C1-C18 alkyl, alkaryl, hydroxyalkyl or aryl, or where R and R' are joined to form a cyclic alkyl carbonate optionally having one or more substituents selected from the group consisting of one or more aryl groups, one or more hydroxy groups, and/or one or more branched alkyl groups.

3. The method of claim 2 where the at least one alkyl carbonate solvent is selected from the group consisting of dialkyl carbonates, cyclic carbonates, and mixtures thereof.

4. The method of claim 1 where the effective amount of the at least one alkyl carbonate solvent is from about 10 wt % to about 90 wt %, based on the stabilized acrolein composition.

5. The method of claim 1 where in the stabilized acrolein composition:
the amount of acrolein ranges from about 0.1 wt % to about 99 wt %; and
the amount of at least one alkyl carbonate from about 10 wt % to about 90 wt %.

6. A stabilized acrolein composition comprising:
acrolein; and
an amount of at least one alkyl carbonate solvent effective to stabilize the acrolein from decomposing.

7. The stabilized acrolein composition of claim 6 where the at least one alkyl carbonate solvent is selected from the group of alkyl carbonates consisting of the formula ROC(=O)OR', where R and R' are independently C1-C18 alkyl, alkaryl, hydroxyalkyl or aryl, or where R and R' are joined to form a cyclic alkyl carbonate optionally having one or more substituents selected from the group consisting of one or more aryl groups, one or more hydroxy groups, and/or one or more branched alkyl groups.

8. The stabilized acrolein composition of claim 7 where the at least one alkyl carbonate solvent is selected from the group consisting of dialkyl carbonates, cyclic carbonates, and mixtures thereof.

9. The stabilized acrolein composition of claim 6 where the effective amount of the at least one alkyl carbonate solvent is from about 10 wt % to about 90 wt %, based on the stabilized acrolein composition.

10. The stabilized acrolein composition of claim 6 where in the stabilized acrolein composition:
the amount of acrolein ranges from about 0.1 wt % to about 99 wt %; and
the amount of at least one alkyl carbonate from about 10 wt % to about 90 wt %.

11. A method for treating a hydrocarbon fluid, the method comprising:
introducing an amount of a stabilized acrolein composition into the hydrocarbon fluid in an amount effective for treating it,
where the stabilized acrolein composition comprises:
acrolein; and
an amount of at least one alkyl carbonate solvent effective to stabilize the acrolein from decomposing within the stabilized acrolein composition.

12. The method of claim 11 where the at least one alkyl carbonate solvent is selected from the group of alkyl carbonates consisting of the formula ROC(=O)OR', where R and R' are independently C1-C18 alkyl, alkaryl, hydroxyalkyl or aryl, or where R and R' are joined to form a cyclic alkyl carbonate optionally having one or more substituents selected from the group consisting of one or more aryl groups, one or more hydroxy groups, and/or one or more branched alkyl groups.

13. The method of claim 12 where the at least one alkyl carbonate solvent is selected from the group consisting of dialkyl carbonates, cyclic carbonates, and mixtures thereof.

14. The method of claim 11 where the effective amount of the at least one alkyl carbonate solvent is from about 10 wt % to about 90 wt %, based on the stabilized acrolein composition.

15. The method of claim 11 where in the stabilized acrolein composition:
the amount of acrolein ranges from about 0.1 wt % to about 99 wt %; and
the amount of at least one alkyl carbonate from about 10 wt % to about 90 wt %.

16. The method of claim 11 where the hydrocarbon fluid comprises crude oil.

17. The method of claim 11 where the effective amount of the stabilized acrolein composition ranges from about 1 ppm to about 10 wt %, based on the hydrocarbon fluid.

18. The method of claim 11 where the treating is selected from the group consisting of:
reducing or preventing microbial activity in the hydrocarbon fluid;
at least partially scavenging hydrogen sulfide from the hydrocarbon fluid;
at least partially dissolving iron sulfide in the hydrocarbon fluid, and
combinations of these.

\* \* \* \* \*